J. L. CREVELING.
ELECTRIC REGULATION.
APPLICATION FILED AUG. 17, 1916.
1,343,905.
Patented June 22, 1920.
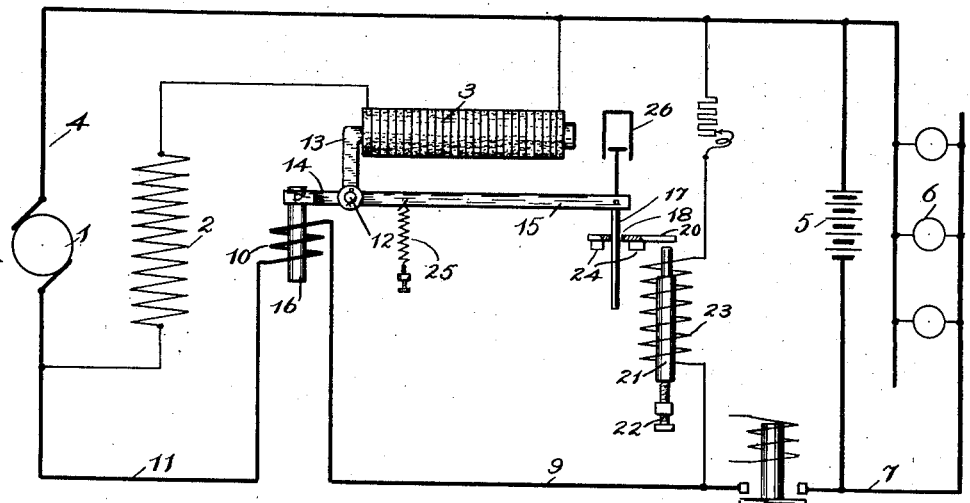
Fig. I.
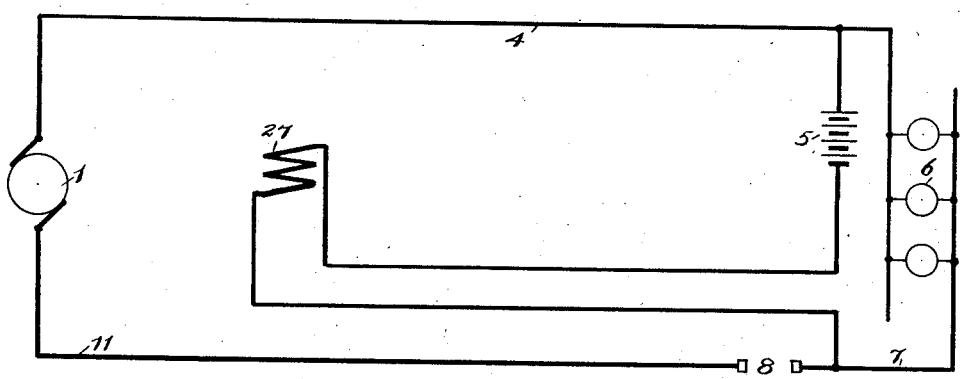
Fig. II.
INVENTOR

UNITED STATES PATENT OFFICE.

JOHN L. CREVELING, OF WHITE PLAINS, NEW YORK, ASSIGNOR TO GOULD COUPLER COMPANY, A CORPORATION OF NEW YORK.

ELECTRIC REGULATION.

1,343,905.  Specification of Letters Patent.  Patented June 22, 1920.

Application filed August 17, 1916. Serial No. 115,419.

*To all whom it may concern:*

Be it known that I, JOHN L. CREVELING, a citizen of the United States, residing in White Plains, county of Westchester, and State of New York, have invented certain new and useful Improvements in Electric Regulation, of which the following is a description.

My invention pertains to that class of electric regulation wherein it is desired to regulate a controllable source of electrical potential difference and has for a particular object to provide means whereby said source may be automatically regulated in a predetermined manner. A further object of my invention is to provide means whereby the current in a circuit supplied from said source may be held within predetermined limits and means whereby the voltage across a circuit supplied by said source may also be held from exceeding a predetermined limit. As such systems of regulation are particularly useful for regulating a dynamo operating to charge a storage battery and maintain lamps or other translating devices and more especially when the dynamo is driven at variable speeds causing its voltage and consequent current output to tend to widely vary, my invention will be described with particular reference to such a system.

In the drawing, Figure I. is a diagrammatic representation of one type of system embodying the essentials of my invention.

Fig. II. shows a portion of a system similar to that of Fig. I. in which a modification is shown without departing from my invention.

In the drawing, 1 represents a dynamo or generator provided with the usual field coil 2, having in series therewith a regulating device or element, in this instance indicated as a carbon pile 3, and it will be obvious that the dynamo may be regulated by regulating the pressure upon the carbon pile 3 in a well known manner. 4 represents the positive lead of the dynamo which is in electrical communication with the positive side of the storage battery 5 and the positive terminals of lamps or other translating devices indicated at 6. The negative terminals of the translating devices 6 and the battery 5 are in communication with the lead 7 carried to one side of any suitable automatic switch indicated at 8. This switch, the mere presence of which is indicated in the drawing for the sake of clearness, is preferably one of the automatic variety adapted to close its circuit when the generator voltage is substantially equal or slightly in excess of that of the storage battery and to open the circuit when the generator voltage falls very slightly below that of the storage battery in such manner as to prevent back discharge from the battery through the generator.

The opposite terminal of the switch 8 is connected as by the lead 9 with one end of the series coil or solenoid 10, the opposite end of which is connected as by lead 11 with the negative brush of the generator 1. The pivot 12 carries a lever having the three branches 13, 14 and 15 which are in fixed relation with regard to each other and rotatable about the said pivot, preferably with negligible friction. The branch 13 presses upon one end of the carbon pile 3, the opposite end of which is stationary, and manipulation of the said branch 13 will, therefore, regulate the generator by controlling the excitation of the field coil 2. 14 is a short arm carrying the core 16 of iron or other magnetic material normally drawn in a downward direction by the coil 10 when the said coil is energized. 15 is a long arm preferably several times the length of the arm 14 and carrying at its outward extremity a smooth, depending rod 17 which passes through an aperture 18 in a clutch member 20, adapted to be engaged by the core 21 when the same is raised from its adjustable stop 22 by action of current in the solenoid 23 surrounding the said core and in shunt across the generator circuit and having in series therewith a variable resistance for the purpose of adjustment. When the core 21 rests upon its stop 22, the member 20 rests upon its two stops 24 so as to lie in a horizontal position and as the aperture 18 is appreciably larger than the rod 17, the same may freely pass with negligible resistance through the member 20 when the said member rests upon its stops 24. However, if the core 21 be raised, the member 20 will be canted as the said core engages one side thereof and then the edges of the member 20 at the aperture 18 will grip the rod 17 and further elevation of the core 21 will carry the member 20, rod 17 and lever 15 therewith so as to decrease the pressure upon the pile 3. 25 is an adjustable spring tending to draw the lever 15 downwardly to increase the pressure upon the pile 3 and 26 is a dashpot arrangement restraining too sudden movement of the lever 15.

In Fig. II. like numerals are used to indicate like parts and the only modification intended to be brought out by the said figure resides in the coil 27 in series with the battery circuit which may be used in place of coil 10 of Fig. I. which is in the main or generator circuit.

An operation of my invention is substantially as follows:

If the dynamo be at rest or running at low speed, the switch 8 will be open and translating devices 6 may be maintained by the battery 5 in a well known manner. If the generator have its voltage raised until in excess of that of the battery, the switch 8 will close and current will flow from the generator 1 through lead 4, battery 5 and translating devices 6 to lead 7, switch 8, then through lead 9, coil 10 and lead 11 to the generator. Current will also flow through coil 23 which is shown in shunt across the generator and tend to raise the core 21, and I so adjust the weight of the said core or provide a spring for said purpose if desirable, or I may adjust the variable resistance in series with the said coil so that when the dynamo voltage reaches a predetermined maximum which it is desired shall not be exceeded the core 21 will be raised so as to cant the member 20 into engagement with the rod 17 and then further elevation of the core 21 will raise the lever 15 smoothly against the action of dashpot 26 and adjustable spring 25 and relieve the pressure upon the pile 3 in such manner as to cut down the field excitation and prevent this maximum desired voltage from being exceeded. If, thus operating, this maximum voltage desired upon the system would increase the current output of the generator beyond a desired limit as for example a protective limit, then coil 10 which is responsive to the generator output will draw the core 16 downwardly and prevent this maximum current output from being exceeded. If too great a current would be delivered with the generator voltage appreciably below that for which the voltage regulating means is set, the function of regulation of the generator will be practically usurped by the coil 10 which in order to hold the current within its predetermined desired limit will lower the voltage of the generator below that necessary to raise the core 21 and the same will be allowed to approach and rest upon its stop 22. The member 20 will as it approaches the horizontal position cease to grip the rod 17 and slide downwardly upon the same until resting upon its stops 24, when it will cease to engage the rod altogether. Then variations in current in the coil 10 will serve entirely to regulate the generator. If while so operating with the maximum current value held from excess by the coil 10, it would require a voltage to produce such current in excess of that for which the voltage regulating means is adjusted, coil 23 will then raise core 21 and cause the member 20 to engage the rod 17 at whatever position it may be and then the coil 23 will usurp the function of regulation and the current in the coil 10 will fall off. If this rise in voltage causing the voltage regulator to come into play and take the work away from the current regulator be due for example to rise in voltage across the storage battery as the same becomes charged, the current in the coil 10 will, of course, fall off still further as the battery voltage rises inasmuch as the generator voltage will be held substantially constant and when the battery voltage has risen sufficiently, the current in the coil 10 will be quite small or negligible. However, the reduction of the current from its maximum value down to a small or even negligible value in the coil 10 will not seriously affect the operation of the voltage responsive means even though withdrawing its assistance therefrom because the voltage responsive coil and co-operating mechanism is preferably made quite powerful and of long range and operates through the long lever 15, preferably several times the length of that of the lever 14, so that changes in the load even though at times capable of performing the entire regulation do not seriously alter the standard operation of the voltage responsive means, notwithstanding the current responsive means is always mechanically connected with the operating mechanism of the pile 3. In order that this feature may be further and better accomplished, it will be noted that the voltage responsive means, even though operating upon the end of a comparatively very long lever, does not have to move the core 21 throughout the entire arc described by the end of the said long lever but by use of the clutch mechanism shown I can use a powerful voltage responsive magnet system of reasonably short range; for if the member 20 engages the rod 17 after magnet 10 has elevated the rod 17 considerably, the work which has been done by the coil 10 in raising the rod 17 is taken off of what the voltage responsive means would otherwise have had to do as it will engage the rod 17 after some work has been done and then further increases in voltage will be prevented as above outlined. If while thus engaged the voltage upon the system fall and lower the member 20 until it reaches contact with one of the members 24 and this does not sufficiently decrease the resistance of the pile 3, the core 21 will allow the end of the member 20 which it engages to fall and the said member will approach a horizontal position until the clutch mechanism releases the rod 17 and the same will be drawn downwardly through the member 20 by the action of spring 25 until sufficient voltage upon the system is reached that the coil 23 will slightly elevate the core 21 and press the clutch into engagement with the rod 17, when a further increase in voltage, as for example if the generator speed be increased, will be prevented by the core rising and operating the resistance 3 as before. In other words, by using the clutch mechanism and allowing the voltage responsive means to have its work piecemeal, so to speak, and allowing it to accept assistance or usurp the work which has been done by the coil 10, I am enabled to make my regulator so powerful in response to slight voltage fluctuations that its voltage adjustment will not be seriously affected by considerable changes in the current output affecting the current responsive means, always mechanically connected with the regulating element and always in condition to prevent overloading.

An operation of that modification intended to be brought out by Fig. II. is substantially the same as that described above with respect to Fig. I., with the exception that the current responsive means is affected only by the current in the battery circuit instead of being responsive to the generator total output as shown in Fig. I.

I do not wish in any way to limit myself to any of the exact details of construction or modes of operation set forth above merely to portray an embodiment of my invention for it is obvious that wide departure both in construction and in operation may be made without departing from the spirit and scope of my invention which is as set forth in the following claims:

1. Regulating means comprehending current responsive means, voltage responsive means, means operated thereby affected in functionally different degree by like mechanical efforts applied thereto by said responsive means and clutching means whereby the voltage responsive means engages and disengages said operated means.

2. Regulating means comprehending current responsive means, voltage responsive means, regulating means operated thereby affected in functionally different regulating degrees by equal fluctuations in mechanical efforts of the responsive means and means for disengaging and engaging the voltage responsive means including a clutch.

3. Means for regulating a generator to hold its current constant when the same reaches a predetermined value and to hold its voltage constant when the same reaches a predetermined value comprehending a regulating element, movable means for affecting the same, current responsive means connected with said movable means, voltage responsive means and engaging means including a clutch operated thereby for engaging the movable means to affect the same in response to voltage fluctuations, the arrangement of the movable means and the responsive means being such that small mechanical efforts on the part of the voltage responsive means, when above a certain value, so dominate the effect of equal efforts on the part of the current responsive means that the regulation in response to such voltage fluctuations is substantially unaffected by the current fluctuations caused by the effect of the operation of the voltage responsive means.

4. Means for regulating a generator comprehending a regulating element, movable means for affecting the same, current responsive means permanently connected with said movable means, voltage responsive means and clutching means operated thereby for engaging the movable means upon rise in voltage above a predetermined standard and capable of disengaging the same to render voltage fluctuations ineffective when said fluctuations cause the voltage value to fall below a predetermined limit, the arrangement of the movable means and the responsive means being such that small mechanical efforts on the part of the voltage responsive means, when above a certain predetermined value, so dominate the effect of equal efforts on the part of the current responsive means that the regulation in response to such voltage fluctuations is substantially unaffected by the current fluctuations caused by the effect of the operation of the voltage responsive means.

5. The combination with a generator of a regulating element affecting the operation thereof, lever mechanism for affecting said element, current responsive means connected with said lever mechanism, clutch mechanism adapted to engage said lever mechanism at a point of functionally greater leverage than the current responsive means and voltage responsive means coöperating with said clutch mechanism to affect the operation of the generator and to substantially usurp the entire regulation of the generator when its voltage reaches a predetermined value.

6. The combination with a dynamo, of means for regulating the same comprehending a regulating device, movable means for affecting said device, current responsive means connected with said movable means, voltage responsive means of relatively greater power than the current responsive means, clutch mechanism for uniting the same with the movable means, the arrangement of the responsive means and the movable means being such that relatively large fluctuations in current are required to affect the regulating device and comparatively very small fluctuations in voltage affect the same to regulate the generator when above a predetermined value.

7. The combination with a dynamo, of means for regulating the same comprehending a regulating device, movable means for affecting said device, current responsive means connected with said movable means, voltage responsive means of relatively greater power than the current responsive means, clutch mechanism for uniting the same with the movable means, the arrangement of the responsive means and the movable means being such that relatively large fluctuations in current are required to affect the regulating device and comparatively very small fluctuations in voltage affect the same to regulate the generator when above a predetermined value with relatively immaterial modification by relatively large changes in current in the current responsive means caused by the action of the voltage responsive means in regulating the dynamo.

8. Means for regulating a dynamo comprehending a regulating device, movable means for affecting the same, current responsive means tending upon all fluctuations in current therein to affect the movable means, mechanically independent voltage responsive means and clutching mechanism operated thereby for engaging the movable means, the arrangement of said movable means and the responsive means being such that small mechanical movements in the portion of the movable means affected by the current responsive means are attended by large mechanical movements in that portion of the movable means affected by the voltage responsive means, and the arrangement of the clutch mechanism being such as to connect the voltage responsive means with the movable means upon relatively small movement when the voltage tends to exceed a predetermined value.

9. The combination with a generator and battery charged thereby, of a regulating device affecting the electrical operation of the generator, lever mechanism for controlling said device, current responsive means connected with said lever mechanism and tending to prevent the current supplied to the battery from exceeding a predetermined limit, clutch mechanism adapted to engage said lever mechanism at a point of greater leverage than the current responsive means and voltage responsive means coöperating with said clutch mechanism to affect the operation of the generator and tending to prevent the voltage impressed upon the battery from exceeding a predetermined limit, the difference in operative leverage between the connections of the current responsive means and the voltage responsive means being of such order of magnitude that the falling off in current to the battery when the same reaches a certain voltage produces substantially immaterial effect upon the voltage held across the battery by the voltage responsive means.

10. The combination with a dynamo and battery charged thereby, of means for regulating the dynamo comprehending a device controlling the electrical operation thereof, movable means for affecting said device, current responsive means affected by current supplied by the dynamo to the battery and so arranged with respect to said movable means that fluctuations in current measured thereby always tend to affect said movable means, voltage responsive means affected by voltage fluctuations across the battery and ineffectively energized when said voltage is below a predetermined value and effectively energized when the voltage exceeds this value to affect the movable means and so arranged with respect to said means that a materially lesser mechanical effort through a greater distance produces the effect upon the said device that a materially greater mechanical effort through a lesser distance on the part of the current responsive means produces, and clutch mechanism whereby the voltage responsive means engages the movable means in any position placed by the current responsive means upon a small effect of the voltage responsive means insufficient to perform a regulating function and whereby further movement caused by the voltage responsive means operates the regulating device.

11. The combination with a variable speed dynamo, a storage battery charged thereby and means for regulating the dynamo to compensate for speed changes comprising a regulating device, of current responsive means affected by generator current for operating said device and at all times tending to affect the same upon current changes, voltage responsive means normally ineffective during charging of the battery till its voltage reaches a desired maximum, clutch mechanism whereby said voltage responsive means engages the regulating device when said desired voltage value is reached by the generator, the arrangement of said voltage responsive means and clutch mechanism with respect to the regulating device being such that the voltage responsive means predominates in the regulation of the dynamo when the clutch is engaged, due to slight voltage changes then having greater effect upon the regulating device than relatively large current changes have during engagement of said clutch mechanism.

JOHN L. CREVELING.